United States Patent
Specht et al.

(10) Patent No.: US 8,740,153 B2
(45) Date of Patent: Jun. 3, 2014

(54) AERODYNAMIC WIND PROPULSION DEVICE HAVING BIELASTIC LINE COUPLING

(75) Inventors: Bernd Specht, Hanstedt (DE); Xaver Paulig, Hamburg (DE); Robert Drechsler, Schoenfeld (DE); Stephan Brabeck, Hamburg (DE)

(73) Assignee: SkySails GmbH & Co. KG, Hamburg (DE)

( * ) Notice: Subject to any disclaimer, the term of this patent is extended or adjusted under 35 U.S.C. 154(b) by 435 days.

(21) Appl. No.: 13/059,373

(22) PCT Filed: Aug. 20, 2008

(86) PCT No.: PCT/EP2008/006831
§ 371 (c)(1),
(2), (4) Date: May 4, 2011

(87) PCT Pub. No.: WO2010/020263
PCT Pub. Date: Feb. 25, 2010

(65) Prior Publication Data
US 2012/0060736 A1    Mar. 15, 2012

(51) Int. Cl.
*B64C 31/06*    (2006.01)
*B64B 1/66*    (2006.01)
*B64F 1/12*    (2006.01)
*B63H 9/04*    (2006.01)

(52) U.S. Cl.
USPC ........ 244/153 R; 244/33; 244/115; 114/102.1

(58) Field of Classification Search
USPC ........ 244/153 R, 154, 155 A, 33, 115, 138 R, 244/142, 158.2; 446/34, 61, 66; 114/102.22, 102.12, 253, 39.29, 272, 114/273; 40/214
See application file for complete search history.

(56) References Cited

U.S. PATENT DOCUMENTS 3,524,613 A * 8/1970 Reuter et al. ............... 244/142
4,982,917 A * 1/1991 Graske .......................... 244/145
(Continued)

FOREIGN PATENT DOCUMENTS

WO    2005/100147 A1    10/2005
WO    2005/100149 A1    10/2005
(Continued)

OTHER PUBLICATIONS

The International Search Report for Application No. PCT/EP2008/006831, mailed Mar. 3, 2010, 4 pages.
(Continued)

*Primary Examiner* — Rob Swiatek
*Assistant Examiner* — Marc Burgess
(74) *Attorney, Agent, or Firm* — Kilpatrick Townsend & Stockton LLP

(57) ABSTRACT

The invention relates to an aerodynamic wind propulsion device, particularly for watercrafts, comprising an aerodynamic wing being connected to a steering unit located below the aerodynamic wing via a plurality of tractive lines, a tractive cable, a first end of the tractive cable being connected to the steering unit and a second end of the tractive cable being connected to a base platform, the aerodynamic wing having an aerodynamic profile which generates an uplift force in the direction of the tractive cable when the airflow direction is about perpendicular to the tractive cable. According to the invention, an aerodynamic wing is provided being coupled to a steering unit located close below the wing via a plurality of tractive lines of different elasticity.

11 Claims, 5 Drawing Sheets

(56) References Cited

U.S. PATENT DOCUMENTS

| | | | | |
|---|---|---|---|---|
| 5,556,057 A | * | 9/1996 | Davies | 244/153 R |
| 6,845,948 B2 | * | 1/2005 | Thomas | 244/155 A |
| 7,546,813 B2 | | 6/2009 | Wrage | |
| 7,672,761 B2 | | 3/2010 | Wrage et al. | |
| 7,798,083 B2 | * | 9/2010 | Wrage | 114/102.1 |
| 8,080,889 B2 | * | 12/2011 | Ippolito et al. | 290/44 |
| 8,220,752 B2 | * | 7/2012 | Leblond | 244/153 R |
| 2004/0195459 A1 | * | 10/2004 | Pouchkarev | 244/153 R |
| 2006/0102794 A1 | * | 5/2006 | Quijano | 244/155 A |
| 2007/0157868 A1 | * | 7/2007 | Wrage et al. | 114/365 |
| 2008/0128558 A1 | * | 6/2008 | Hardham et al. | 244/155 A |
| 2009/0308984 A1 | * | 12/2009 | Hardham et al. | 244/35 R |

FOREIGN PATENT DOCUMENTS

| | | |
|---|---|---|
| WO | WO 2005-100147 A1 | 10/2005 |
| WO | WO 2005-100148 A1 | 10/2005 |
| WO | WO 2005-100149 A1 | 10/2005 |
| WO | WO 2005-100150 A1 | 10/2005 |
| WO | 2007/000788 A1 | 1/2007 |
| WO | WO 2007-000788 A1 | 1/2007 |
| WO | 2007/122650 A1 | 11/2007 |
| WO | WO 2007-122650 A1 | 11/2007 |

OTHER PUBLICATIONS

The International Written Opinion for Application No. PCT/EP2008/006831, mailed Mar. 3, 2010, 6 pages.

* cited by examiner

AERODYNAMIC WIND PROPULSION DEVICE HAVING BIELASTIC LINE COUPLING

CROSS-REFERENCE TO RELATED APPLICATION

This application is a National Stage of International Application No. PCT/EP2008/006831, filed Aug. 20, 2008, the disclosure of which is herein incorporated by reference.

BACKGROUND OF THE INVENTION

The invention relates to an aerodynamic wind propulsion device, particularly for watercrafts, comprising an aerodynamic wing being connected to a steering unit located below the aerodynamic wing via a plurality of tractive lines, a tractive cable, a first end of the tractive cable being connected to the steering unit and a second end of the tractive cable being connected to a base platform, the aerodynamic wing having an aerodynamic profile which generates an uplift force in the direction of the tractive cable when the airflow direction is about perpendicular to the tractive cable.

According to this description, an aerodynamic wind propulsion device is to be understood as a device which might be used to drive a movable platform or vessel like a ship or the like. Further, an aerodynamic wind propulsion device is to be understood as a device which is driven by the wind and is movable with reference to a fixed base platform like a platform attached to the ground or fixed in the sea like e.g. for onshore or offshore wind energy plants.

A major problem associated with such aerodynamic wind propulsion devices as described beforehand is the control of the aerodynamic wing in use. In order to produce significant uplift forces by the aerodynamic wing which can be transferred via the tractive lines and the tractive cable to the movable or fixed base platform it is desirable to increase the size of the aerodynamic wing. However, the control of such large scale aerodynamic wings having sizes of 160 m$^2$ and more is difficult and the loss of control of such large scale aerodynamic wings may result in a situation where the aerodynamic wing crashes and cannot be rescued.

WO 2005/100147 A1 discloses a positioning device for controlling a wing element which is connected via a tractive cable to a ship to serve as main or auxiliary drive. Such propulsion systems based on wing elements flying at high altitude and pulling the ship via a tractive force require large-scale wing elements and the control of such wing elements is a challenging task. In WO 2005/100147 A1 it is proposed to veer out or haul in the tractive cable in response to the flight condition of the wing element. Whereas by such a control mechanism a certain degree of flight control can be achieved, it is not sufficient to control the wing element in all flight conditions, in particular when the wind changes its strength or direction significantly.

To improve control of such wing elements in difficult wind conditions it is known from WO 2005/100148 A1 to couple a steering unit close below the wing element via a number of control lines and to connect the wing element to the nautic vessel via such a steering unit by a tractive cable extending between the nautic vessel and the steering unit. By this, control of the wing element can be improved but it is still a challenging task to control the wing element and specifically to steer the flight path of the wing element.

WO 2005/100149 A1 proposes various sensors to improve control of a wing element towing a nautic vessel. Whereas these and the former techniques may improve the steerability of aerodynamic wing elements it remains still a quite challenging task to efficiently steer and control large scale aerodynamic wing elements and control its flight path and conditions in an efficient way.

The set ups and techniques of aerodynamic wings and their control will significantly improve the steerability and options to control the flight path of such aerodynamic wings. However, it is desirable to provide additional control means which facilitate the control of aerodynamic wings, in particular in challenging control situations like starting and landing manoeuvres.

To improve steerability during starting and landing manoeuvres, WO 2005/100150 proposes a telescopic mast erected on the foredeck of a nautic vessel close to the fixing point of the tractive cable coupling the wing element to the nautic vessel. Using such mast, the wing element can be directly coupled to the top of the mast. Whereas such a technique may significantly improve manoeuvrability of the wing element during starting and landing procedure, the challenging task to improve the steerability of the wing element in various flight conditions and to improve the efficiency of such a steering technique remains.

While such a mast as proposed in WO 2005/100150 will facilitate the starting and landing manoeuvres, it is still a challenging task to safely control the aerodynamic wing while it is coupled to the mast and in the short time period after it has been decoupled from the mast in the starting manoeuvre and is flying at low altitudes. Still further, it is still a challenging task to control the flight path of the aerodynamic wing in the period of approaching to the mask at low altitudes and the period of coupling the aerodynamic wing to the mask after such approach in landing manoeuvres.

One reason for the problems associated with such starting and landing manoeuvres is the fact that the wind speed at low altitudes is different from the wind speed at high altitudes. Thus, the control at high altitudes is a different task than the control at low altitudes.

A still further problem associated with such starting and landing manoeuvres is the fact that large scale aerodynamic wings may transfer high forces to the mast when coupled to it.

BRIEF SUMMARY OF THE INVENTION

It is a first object of the invention to provide an aerodynamic wind propulsion device having an improved control, in particular during starting and landing manoeuvres.

It is a further object of the invention to provide an aerodynamic wind propulsion device which more safely avoids the risk of damages to the system during starting and landing manoeuvres.

It is a further object of the invention to provide an aerodynamic wind propulsion device which allows a lightweight construction.

These and other objects of the invention are achieved by providing an aerodynamic wind propulsion device as described beforehand wherein at least two of said plurality of tractive lines have elastic behaviour in the load range occurring in use of the aerodynamic wind propulsion device and the elastic behaviour of said at least two tractive lines is different.

According to the invention, an aerodynamic wing is provided being coupled to a steering unit located close below the wing via a plurality of tractive lines of different elasticity. By this, the elongation of the tractive lines, i.e. the strain, can be designed to be different at different load conditions. This will allow to provide different geometrical positions of the aerodynamic wing or sections of the aerodynamic wing in relation to the steering unit at differing load conditions. Generally, all tractive lines may show proportional elastic behaviour whereby only one single tractive line may have a different proportional elastic behaviour, i.e. a different Young's modulus, than the other tractive lines thus resulting in a load-dependent deformation of the wing in the region of attachment of said single tractive line.

Alternatively, those lines coupling the front section of the wing to the steering unit may have a different elasticity than those lines coupling the rear section of the wing to the steering unit, thus resulting in a load-dependent change of the arrangement of the wing to the steering unit whereby the geometry of the wing itself remains unchanged. The elasticity or elastic property is to be understood as the magnitude of the stress-strain-ratio over the whole load range of the tractive line in its use.

Such elastic property of at least two tractive lines is defined to be different if at least in one part of the load range occurring in use said stress strain ratio is different. This may be achieved by tractive lines being tight over the whole load range and thus being exposed to strain over the whole load range but having a different stress-strain-ratio in at least one part of said load range. Further, this may be achieved by a plurality of tractive lines having the same Young's modulus but being coupled to the aerodynamic wing and the steering unit in such a way that at least one of the lines is loose in a first load condition and is getting tight when increasing the load. By this, said loose line will experience no strain in a first part of the load range acting onto the aerodynamic wing but will be strained after having reached a certain load level, whereas other tractive lines are strained in the first part of the load range as well, thus providing a different elastic property.

According to a first preferred embodiment one tractive line of said plurality of tractive lines is formed by at least two parallel tractive line sections which are attached to identical attachment points at the aerodynamic wing and the steering unit, respectively whereby the length and the elastic properties of said two tractive line sections is selected such that in a first low load condition within the load range occurring in use of the aerodynamic wind propulsion device the length of said two tractive line sections is different at a second medium load condition within said load range the shorter one is elongated to such an extent that its length corresponds to the length of the longer one of said two tractive lines and at a third high load condition within said load range both of said two tractive lines are elongated. By this, a tractive line having unproportional elastic properties is formed by two or more tractive line sections having different length and being coupled to the same attachment points, wherein one or more of the lines is loose in a first load condition but is tight in a second load condition. In such arrangement having two tractive line sections of different length coupled in parallel to the same attachment points, a tractive line having bielastic properties is provided. Such tractive line having bielastic properties is to be understood as a line which has two distinct stress strain behaviours at two different load ranges or has two distinct stress strain behaviour ranges in said two different load ranges.

According to a further preferred embodiment of the invention, at least one of said plurality of tractive lines connecting the aerodynamic wing to the steering unit has unproportional elastic properties in the load range occurring in use of the aerodynamic wind propulsion device. Said at least one tractive line having unproportional elastic behaviour may preferably have a different elastic behaviour in the load range occurring in use of the aerodynamic wind propulsion device than at least one other tractive line coupling the aerodynamic wing to the steering unit.

It is to be understood that a line having unproportional elastic properties is to be understood as a line which has at least two different stress strain behaviour characteristics when being exposed to a first and a second stress of different magnitude. This may be achieved by providing a line which has a continuous and proportional stress strain behaviour in a first load range which can be described by a first slope of the stress strain curve in this load range and having a second continuous and proportional stress strain behaviour in a second load range which is different from that behaviour in the first load range and which may be described by a second, different slope of the stress strain curve in this load range. In such case, a point of discontinuity will be present between the first and the second load range in the stress strain curve of the line.

However, in an alternative to the foregoing example, the stress strain curve may be continuous over the whole load range and may be unproportional in that the slope of the stress strain curve continuously changes with increasing loads or at least shows such continuous change in a particular load range. Further, it is to be understood that the term unproportional elastic property according to this description and the claims may be fulfilled by a line having a combination of both aforementioned stress strain behaviours, i.e. a continuous and discontinuous curve section and having proportional and unproportional curve sections of the stress strain curve in the load range occurring in use.

It is generally known that a number of lines, in particular those lines which are produced by twisting or braiding a plurality of wires or fibres to one single line or cable or the like show unproportional elastic properties when they are exposed to very high loads and thus undergo high strains. In such high load condition the line or cable undergoes a reckoning wherein the angle of attack of said fibres or wires with respect to the load change to be quite parallel to the fibres whereas the fibres are usually arranged in a slightly oblique direction to the longitudinal axis of the line or cable in the regular load range. In the course of such reckoning, a line and a cable will stiffen. However, this is not to be understood as unproportional behaviour in the load range occurring in use since it is to be avoided that a line or cable is exposed to such loads effecting a reckoning of the line or cable since this may result in failure of single fibres or even the whole line or cable. Thus, conventional lines or cables will never be designed and used in such a way that they reach a load range in use which will cause such reckoning and thus effect an unproportional elastic behaviour.

Moreover, slight changes of the elastic behaviour may result in a change of the direction of single fibres with respect to the longitudinal axis of a line or cable which consists of twisted or braided fibres. This is not to be understood as unproportional elastic behaviour in the sense of the invention as this will not have a significant effect on the elastic properties of the line.

According to a preferred embodiment, said tractive line having unproportional elastic properties is formed by said two tractive line sections described beforehand. It is to be understood, that two line sections of different length coupled in parallel to each other will functionally correspond to one single line having two different stress-strain-ratios, whereby the first stress-strain-ratio is determined by only one of the line sections, the other line section being loose and the second stress-strain-ratio is determined by both line sections being tight and acting in parallel.

In particular, said at least one tractive line having unproportional elastic properties has a first stress-strain behaviour in a first range of the load range occurring in use of the aerodynamic wind propulsion device and a second stress-strain behaviour in a second range of the load range occurring in use of the aerodynamic wind propulsion device whereby the first and the second stress strain behaviour and the first and the second range are different from each other. Such improved line characteristic is particularly preferable since it will allow to adapt the geometrical arrangement of the coupling between the aerodynamic wing and the steering unit to be in two distinct conditions corresponding to a starting and landing manoeuvre which is characterized by a lower load range acting onto the tractive lines and a high altitude condition which is characterized by high loads acting onto the tractive lines.

According to a still further preferred embodiment, multiple tractive lines are provided having different elastic properties in such a way that the angle of attack of the aerodynamic wing in relation to the steering unit is higher in a condition where a low force is acting on the tractive lines than in a condition where a high force is acting on the tractive lines. The angle of attack is an important parameter affecting the aerodynamic properties of the aerodynamic wing and thus the uplift force and the forces generated by the wing and transferred via the tractive lines and the tractive cable. Generally, a small angle of attack is characterized by the aerodynamic wing lying generally in a plane which is parallel to the direction of the wind, whereas a higher angle of attack is characterized by the deck or decks of the aerodynamic wing being in an oblique direction to the direction of the wind whereby the front edge is located above the rear edge of the wing. In the case of the aerodynamic wing being coupled to a steering unit via a plurality of tractive lines, such a change of the angle of attack will usually be provided by a change of the position of the steering unit in relation to the aerodynamic wing. This dependency results from the steering unit and the aerodynamic wing being in a given line of force in relation to the point of attachment of the tractive cable to the base platform.

These geometrical conditions result in a direct dependency of the angle of attack from the position of the steering unit in relation to the aerodynamic wing in the direction of the wind. In case that the steering unit is arranged in a position which is moved forward in relation to the aerodynamic wing, this will result in a lower angle of attack of the aerodynamic wing. Usually, such positioning of the steering unit in a more forward position may be achieved by shortening those (front) tractive lines coupling the steering unit to the front edge or a front region of the aerodynamic wing and/or lengthening those (rear) tractive lines coupling the steering unit to a rear end or a rear portion of the aerodynamic wing.

Vice versa, a position of the steering unit in a more rearward position to the aerodynamic wing would increase the angle of attack and may be achieved by a lengthening of the front tractive lines and/or a shortening of the rear tractive lines coupling the steering unit to the front edge/front region and the rear end/rear portion, respectively.

According to the above-referenced preferred embodiment, the angle of attack is increased in a low load condition. This will result in a higher angle of attack when the wind forces acting onto the aerodynamic wing decrease such as for example during starting and landing manoeuvres at low altitudes having low wind speed. However, such arrangement of the unproportional tractive lines will further stabilize the flight properties of the aerodynamic wing at high altitudes as well. In such case, a sudden decrease of the wind will increase the angle of attack and thus stabilize the uplift forces generated by the aerodynamic wing and vice versa a sudden increase of the wind speed will decrease the angle of attack and effect such stabilizing effect as well.

According to a further preferred embodiment, a plurality of tractive lines have unproportional elastic behaviour and the unproportional elastic behaviour of at least two tractive lines is different. As discussed beforehand, an unproportional elastic behaviour of one or more tractive lines may preferably be used to change the geometric relation of the aerodynamic wing in relation to the steering unit and to thus change the angle of attack of the aerodynamic wing in relation to the direction of the wind. While this might even be achieved with an unproportional elastic property of one or more tractive lines which is similar for all tractive lines, it is preferable to provide tractive lines with different unproportional elastic properties. While in the former case the geometric changes will follow different forces acting onto similar tractive lines in the latter case such geometric changes may even be realized in load conditions where all tractive lines are subjected to the same load. In such case, some of the tractive lines, e.g. those front tractive lines coupling the steering unit to the front edge or a front region of the aerodynamic wing, may show higher strain at the load whereas other tractive lines, e.g. the rear tractive lines coupling the steering unit to the rear edge or a rear region of the aerodynamic wing may show a small strain.

It is particularly preferred that one or more tractive lines coupling the front of the aerodynamic wing to the steering unit have a first stress-strain ratio in a load range below a first load condition and wherein one or more tractive lines coupling the rear end of the aerodynamic wing to the steering unit have a second stress-strain ratio in a load range below a second load condition, wherein the first stress-strain ratio is lower than the second stress-strain ratio. In this preferred embodiment, the steering unit will be positioned more forward in relation to the aerodynamic wing, thus decreasing the angle of attack if the loads acting onto the tractive lines increase. This is achieved by providing rear tractive lines showing a higher strain than the front tractive lines when increasing the loads thus moving the steering unit in a more forward position in relation to the wing and decreasing the angle of attack at increasing the loads and viceversa moving the steering unit in a more rearward position in relation to the wing and increasing the angle of attack at decreasing loads. It is to be understood that the first and second load condition may be characterized by identical or by different load levels.

According to a further preferred embodiment one or more tractive lines coupling a front section of the aerodynamic wing to the steering unit maintain a third stress-strain ratio in a load range above a first load condition and wherein one or more tractive lines coupling a rear section of the aerodynamic wing to the steering unit have a fourth stress-strain ratio in a load range above a second load condition, wherein preferably the third stress-strain ratio is higher than the fourth stress-strain ratio. This will automatically reduce the angle of attack if the loads acting onto the aerodynamic wing increase by an increased elongation of those tractive lines coupling the rear section of the aerodynamic wing to the steering unit in relation to those tractive lines coupling the front section to the steering unit. It is to be understood that the first and second load condition may be characterized by identical or by different load levels and may in particular be identical to the first and second load conditions according to the foregoing embodiment.

In the two preferred embodiments described beforehand, the first load condition may preferably be lower than the second load condition. This will allow to automatically decrease the angle of attack if the load acting onto the aerodynamic wing increases and thus allow for optimized aerodynamic properties in starting and landing manoeuvres on the one hand and in high altitude flight conditions on the other hand. By this, it is possible to combine an improved behaviour of the aerodynamic wing during starting and landing manoeuvres (i.e. at low wind speed conditions) and a safe protection of the wing and its associated elements when being exposed to overload conditions (i.e. at high wind speed conditions). This can be achieved without active hauling in or veering out specific tractive lines (like steering lines coupled to an actuator or the like) and is realized by passive elongation behaviour of one single set of tractive lines.

According to a further preferred embodiment, at least one of said tractive lines has elastic properties, preferably unproportional elastic properties, which are different from other tractive lines to effect a deformation of the aerodynamic wing element in a first load condition to decrease the uplift forces and/or to increase the air drag generated by the aerodynamic wing and to establish an optimum aerodynamic shape in a second load condition to generate maximum uplift force and/or minimum air drag by the aerodynamic wing, wherein the first load condition is preferably lower than the second load condition. By this, the aerodynamic wing might be shaped to decrease the uplift force or to decrease the speed in relation to the wind in a first load condition such as during a starting or landing manoeuvre to facilitate such manoeuvre. Further, it might be preferable to decrease the uplift force or to decrease the speed in relation to the wind in a first load condition such as an overload condition to prevent damages of the aerodynamic wing or any associated elements of the aerodynamic wind propulsion device in such overload situation. Preferably, one single tractive line effects the deformation of the aerodynamic wing in said first load condition by having an unproportional elastic property which is different from the elastic property of all other tractive lines.

In said embodiment, said at least one tractive line having elastic properties which are different from the other tractive lines may preferably be coupled to a section of the aerodynamic wing, preferably a centre section, to effect a deformation of said centre section in the first load condition such that the aerodynamic profile in the first load condition has a cross section that is different from an ideal aerodynamic wing cross section. This is to be understood that a pair or couple of tractive lines coupled to said section of the wing may effect such deformation.

According to a further preferred embodiment, at least one of said tractive lines has elastic properties, preferably unproportional elastic properties, which are different from other tractive lines to provide a first curvature of the aerodynamic wing in a first load condition and to change this first curvature to a second curvature in a second load condition, wherein the curvature of the aerodynamic wing is a curvature in a side-elevational cross section of the aerodynamic wing or a front cross section of the aerodynamic wing. According to this embodiment, when changing the curvature of the aerodynamic wing in a side-elevational cross section this may help to adapt the uplift force generated by the aerodynamic wing to the specific wind speed and to thus stabilize the flight condition of the aerodynamic wing. In case that the curvature of the aerodynamic wing is changed in a front elevational cross section, i.e. the outward side tips of the aerodynamic wing which are usually directed towards the steering unit the side tips are moved outward and upward to a geometric arrangement where the outward region of the aerodynamic wing produces significant uplift forces. This may be used to provide increased uplift forces at low wind speeds to stabilize the flight condition of the aerodynamic wing and to decrease the risk that the side tips fold inwards in case of side wind.

It is further preferred that at least one of said tractive lines has elastic properties, preferably unproportional elastic properties, which are different from other tractive lines to provide a first washout of the aerodynamic wing in a first load condition and to change this first washout to a second washout in a second load condition, wherein the washout of the aerodynamic wing is the, magnitude of a difference of the angle of attack in a first region of the aerodynamic wing to the angle of attack in a second region of the aerodynamic wing. The washout of the wing is to be understood as the angle of attack of the wing in a first region in relation to a second region. The difference of said angle of attack may be zero in one of the first or second load condition thus resulting in a wing which is not twisted and thus has no washout in one of the conditions which however may be understood as a first or second washout according to the invention.

In the foregoing embodiment it is particularly preferred that the washout is changed in such a way that the angle of attack of the side ends, in particular only the tips of the aerodynamic wing is changed between the first and the second load condition. In particular, providing a washout at the side ends or tips of the wing resulting in an increased angle of attack may prevent unwanted inward folding of the tips in starting and landing manoeuvres of the wing, whereas decreasing said angle of attack may improve the aerodynamic efficiency of the wing at high wind speed.

As discussed beforehand, the unproportional elastic properties of a tractive line according to the foregoing embodiments may be characterized by two distinct elastic properties each being proportional and thus resulting in a discontinuous transfer point between these two distinct properties or may be characterized by a continuous change from one elastic property to another elastic property.

The invention will be explained in more detail below with reference to the figures. In the figures,

BRIEF DESCRIPTION OF THE DRAWINGS

FIG. 5: is a stress strain curve of a tractive line having unproportional elastic properties, and.

DETAILED DESCRIPTION OF THE INVENTION

Figure 1:
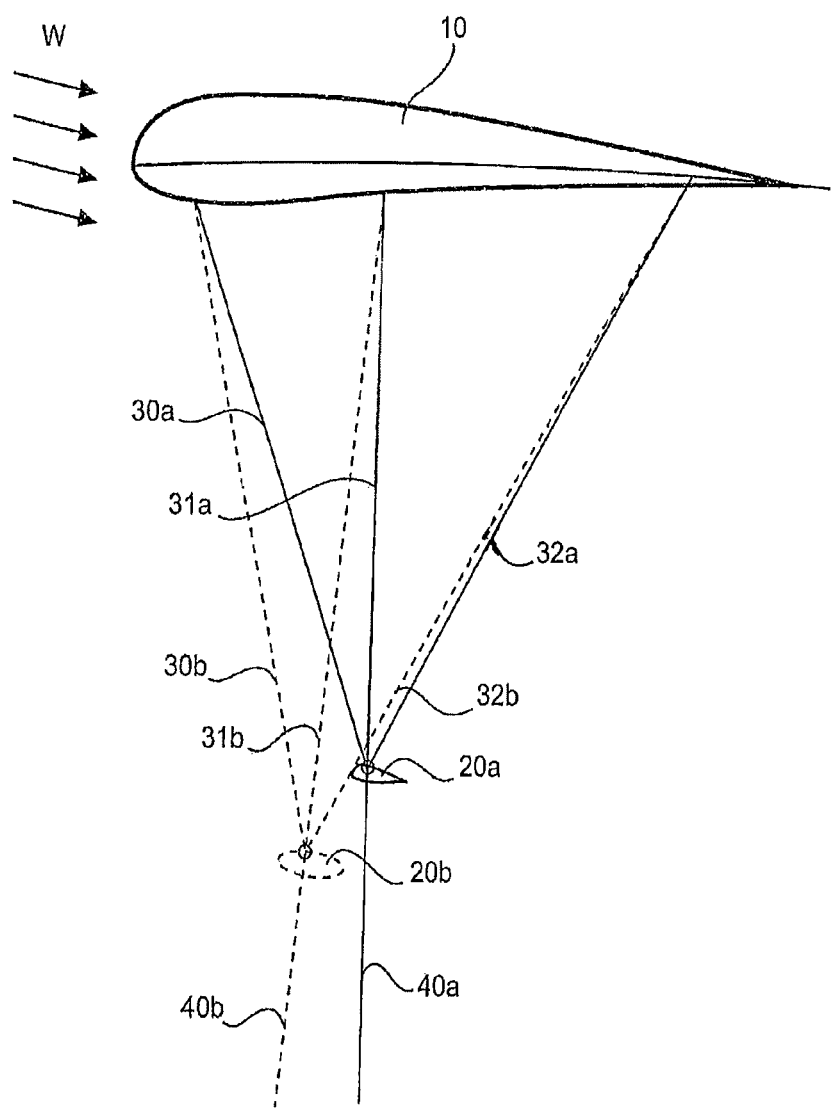
FIG. 1: is a side-elevational schematical view of an aerodynamic wind propulsion device according to the invention in two different load conditions, FIGS. 2a,b: are side-elevational schematical views of a second embodiment of the invention in two different load conditions.

Referring first to FIG. 1, an aerodynamic wing 10 is shown in a cross-sectional side-elevational view.

The aerodynamic wing is coupled to a steering unit 20 via a plurality of front tractive lines 30a coupling the steering unit to a front region of the aerodynamic wing. Further, a plurality of middle tractive lines 31a are provided coupling the steering unit 20 to a middle region of the aerodynamic wing and a plurality of rear tractive lines 32a are provided coupling the steering unit to a rearward region of the aerodynamic wing 10.

Tractive lines 30a, 31a, 32a are shown in continuous line correspond to a first, lower load condition of the aerodynamic wind propulsion device. In this first, lower load condition the aerodynamic wing is in a geometrical position to the steering unit 20a depicted in continuous lines which relates to a relatively high angle of attack in relation to the direction of the wind W acting onto the aerodynamic wing.

Tractive lines 30b, 31b, 32b shown in dashed lines correspond to tractive lines 30a, 31a, 32a and relate to these tractive lines in a second, high load condition of the aerodynamic wind propulsion device. As can be seen from the figure, the steering unit is positioned in a greater distance in a vertical direction from the aerodynamic wing 10 and is positioned in a more forward direction in relation to said aerodynamic wing 10. The steering unit 20b shown in dashed lines corresponds to this position in the second, higher load condition.

In this second, higher load condition, the angle of attack of the aerodynamic wing in relation to the direction of the wind W is lower than in the first, lower load condition.

A tractive cable 40a, b couples the steering unit 20a to a base platform (not shown).

The change of angle of attack is achieved by providing different unproportional elastic properties of the tractive lines 30a, b, 31a, b and 32a, b. As can be seen from the figure in the second, higher load condition, the front tractive lines 30b are stretched to a smaller amount than the rear tractive lines 32b in relation to the higher load condition of the corresponding tractive lines 30a and 32a. This is achieved by providing front tractive lines 30a, b which are stiffer than the rear tractive lines 32a, b in the second, higher load condition than in the first, lower load condition.

Figure 2A:
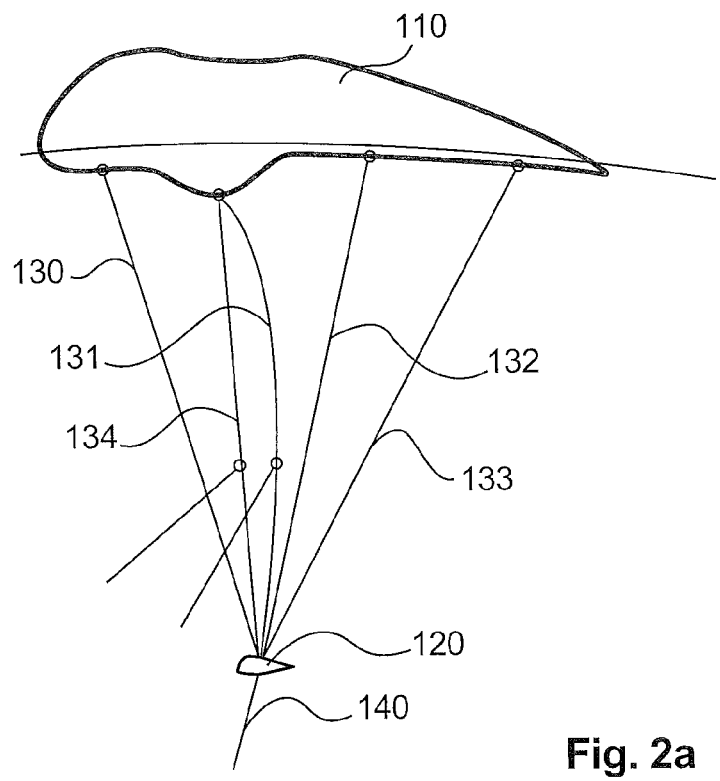

Referring now to FIGS. 2a, b, a second embodiment of the aerodynamic wind propulsion device is depicted. The aerodynamic wind propulsion device comprises an aerodynamic wing 110 coupled to a steering unit 120 via a plurality of tractive lines. The tractive lines are divided into front lines 130, front middle lines 131, rear middle lines 132 and rear lines 133 which couple the steering to a front region, a front middle region, a rear middle region and a rear region of the aerodynamic wing 110, respectively.

As shown, a tractive cable 140 couples the steering unit 120 to a base platform (not shown).

According to this embodiment, an additional tractive line 134 is provided. The additional tractive line 134 has proportional elastic properties and is attached to the same attachment points at the aerodynamic wing and the steering unit like the front middle tractive line 131.

The tractive lines 130-133 may have proportional or unproportional elastic properties. For the functioning of the second embodiment it is important that the proportional elastic properties of the additional tractive line 134 is different from the elastic properties of the tractive lines 131 in at least one load range. By this, tractive line 131 and additional tractive line 134 from as a functional unit one tractive line having unproportional elastic properties.

As shown in FIG. 2a, the additional tractive line 134 is shorter in the first, lower load condition than the front middle tractive line 131. By this, a deformation of the aerodynamic wing in the front middle region is realized resulting in a deceleration of the aerodynamic wing. This will help to limit the maximum speed of the aerodynamic wing during starting and landing manoeuvres.

Figure 2B:
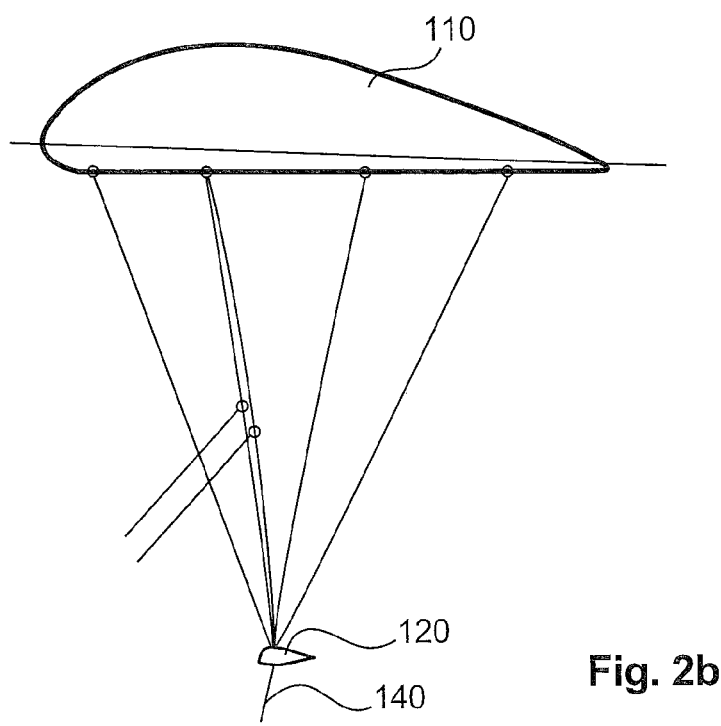

As shown in FIG. 2b in a higher load condition the length of the additional tractive line 134 is similar to the front middle tractive line 131 resulting in an optimum aerodynamic profile of the aerodynamic wing 110. This will allow optimum output of speed and uplift force of the aerodynamic wind propulsion device in a second, higher load condition corresponding to the optimum range of wind speed of the aerodynamic wing.

Figure 3A:
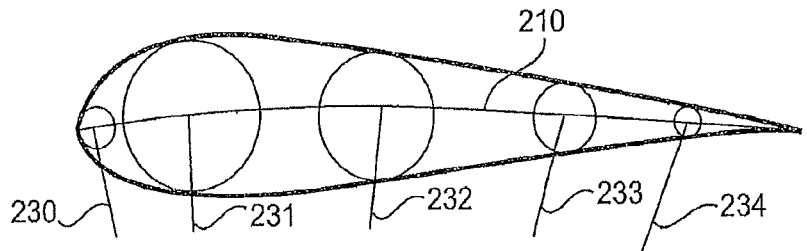
FIGS. 3a-c: are side-elevational cross sectional views of an aerodynamic wing incorporated in the aerodynamic wind propulsion device according to the invention in three different load conditions.
Figure 3B:
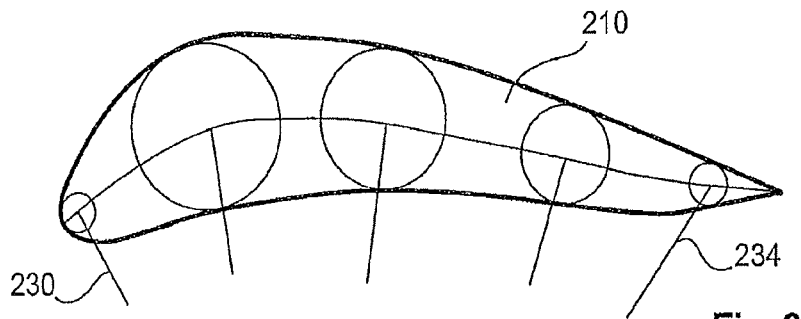
Figure 3C:
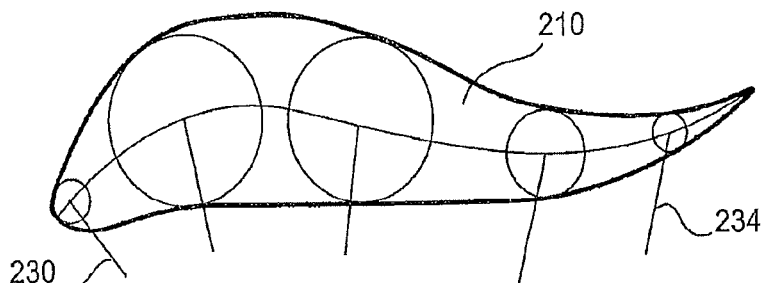

Referring now to FIGS. 3a, 3b and 3c, an aerodynamic wing 210 is shown in three different load conditions.

The aerodynamic wing 210 is coupled to a steering unit (not shown) via a plurality of tractive lines 230-234 which are distanced from each other in a longitudinal direction of the aerodynamic wing 210. It is to be understood that each tractive line 230-234 represents a plurality of tractive lines which are distanced from each other in a transverse direction of the aerodynamic wing 210.

The tractive lines 230-234 each have different unproportional elastic properties. As shown in FIG. 3a, in a first, optimum load condition the length of the tractive lines 230-234 results in an optimum aerodynamic profile of the aerodynamic wing 210.

In FIG. 3b, the same aerodynamic wing 210 is shown in a lower load condition than in FIG. 3a. As can be seen from this figure, in this lower load condition the front tractive line 230 and the rear tractive line 234 are shortened more than the middle tractive lines 231-233 when compared to the optimum load condition in FIG. 3a. By this, a higher curvature of the aerodynamic wing 210 is achieved, thus increasing the uplift force of the aerodynamic wing. This will help to stabilize the flight condition of the aerodynamic wing 210 in a starting and landing manoeuvre where lower wind speed is present and effects lower loads acting onto the aerodynamic wing and the tractive lines.

Referring now to FIG. 3c, the aerodynamic wing is shown in a higher load condition than in FIG. 3a and FIG. 3b. As can be seen, in this higher load condition, the rear tractive lines 234 is elongated more than the other tractive lines 230-233, thus effecting a deformation of the rear end of the aerodynamic wing 210 in an upward direction. This will significantly decrease the uplift forces generated by the aerodynamic wing 210 and decelerate the speed of the aerodynamic wing in relation to the wind. By this, in a critical high load condition, the uplift force and the speed of the aerodynamic wing can be decreased, thus protecting the aerodynamic wing and any other elements of the whole aerodynamic wind propulsion device before damage.

Figure 4:
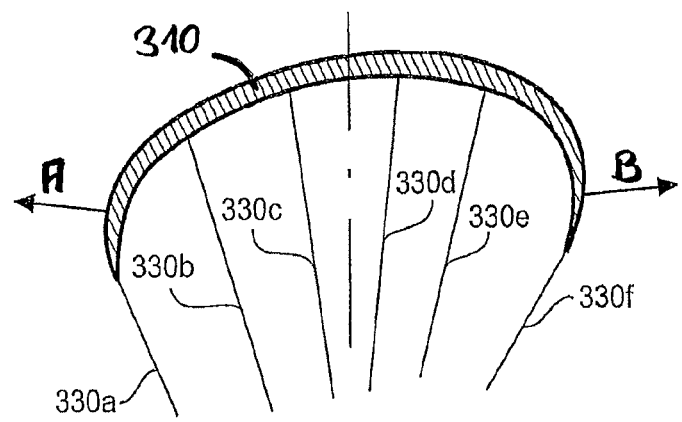
FIG. 4: is a schematical front-elevational view of an aerodynamic wing incorporated in an aerodynamic wind propulsion device according to the invention.

When further referring to FIG. 4, an aerodynamic wing 310 is shown in a cross sectional, front elevational view.

The aerodynamic wing 310 is coupled to a steering unit (not shown) via a plurality of tractive lines 330a-f. It should be understood, that each tractive line 330a-f represents a set of tractive lines 330-334 as shown in FIG. 3a-c.

As can be seen from the figure, the side tips of the aerodynamic wing 310 are directed downwards in an optimum flight condition at optimum load. While this is an optimum geometry of the aerodynamic wing 310 to stabilize its flight path in optimum load condition and wind speed, it would be desirable to increase the uplift force in a lower load and wind speed condition and to prevent inward folding of the side tips in case of side winds.

As schematically depicted by arrow A, B, this can be achieved by providing tractive lines 330a and 330f coupled to the sideward tips of the aerodynamic wing 310 and having different unproportional elastic properties than those tractive lines 330b-e coupling the middle part of the aerodynamic wing 310 to the steering unit. By this, it can be realized that the sidewards tractive lines 330a and 330f lengthen in a low load condition to a higher amount than the middle tractive lines 330b-e, thus resulting in a deformation of the aerodynamic wing 310 which is characterized by a sideward and upward movement of the tips of the aerodynamic wing 310 as schematically shown by arrows A, B.

This will significantly increase the effective surface of the aerodynamic wing 310 and thus increase the uplift forces at a low load when compared to the optimum load shown in FIG. 4 and prevent inward folding of the side tips.

Figure 5:
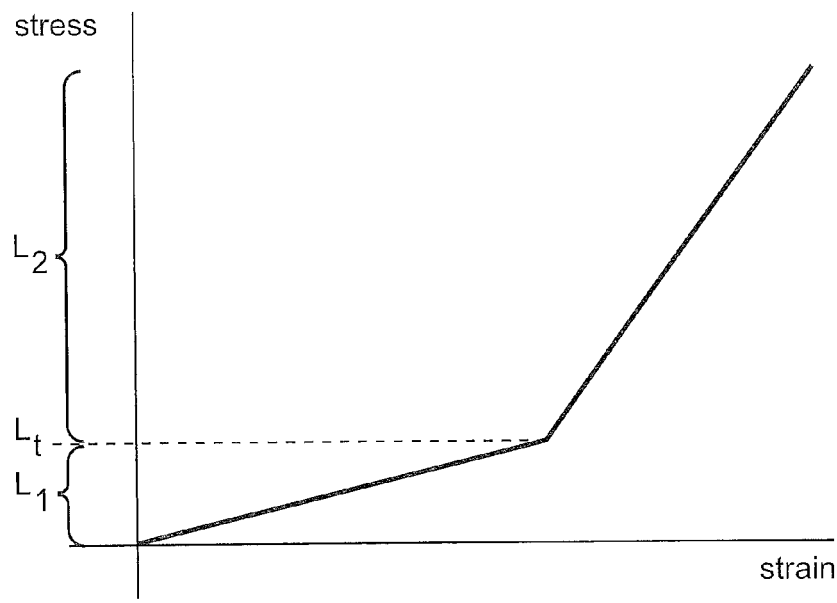

Referring now to FIG. 5, a typical, schematical stress strain curve of a tractive line according to the invention is shown. It is to be understood that the stress depicted in this diagram on the Y-axis signalizes the total load acting onto the tractive line.

As can be seen, the tractive line undergoes in a first, lower load range L1 a large strain. This will characterize the starting and landing manoeuvre and allow for deformation of the aerodynamic wing or change of the angle of attack as described beforehand.

After reaching a transitional load Lt the tractive line is subjected to a higher load L2. In the higher load range the tractive line is subjected to less strain, i.e. the slope of the stress strain curve is steeper than in the first, lower load range L1. The second, higher load range L2 characterizes the optimum load range for flight in high altitudes of the aerodynamic wing.

Figure 6A:
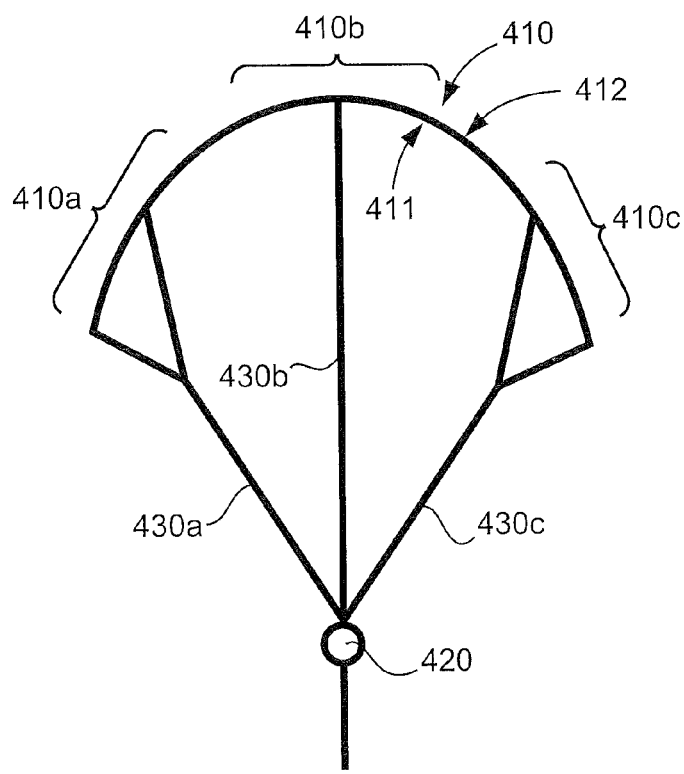
FIGS. 6a-c are front elevational schematical views of three different washout conditions of an aerodynamic wing according to the invention.
Figure 6B:
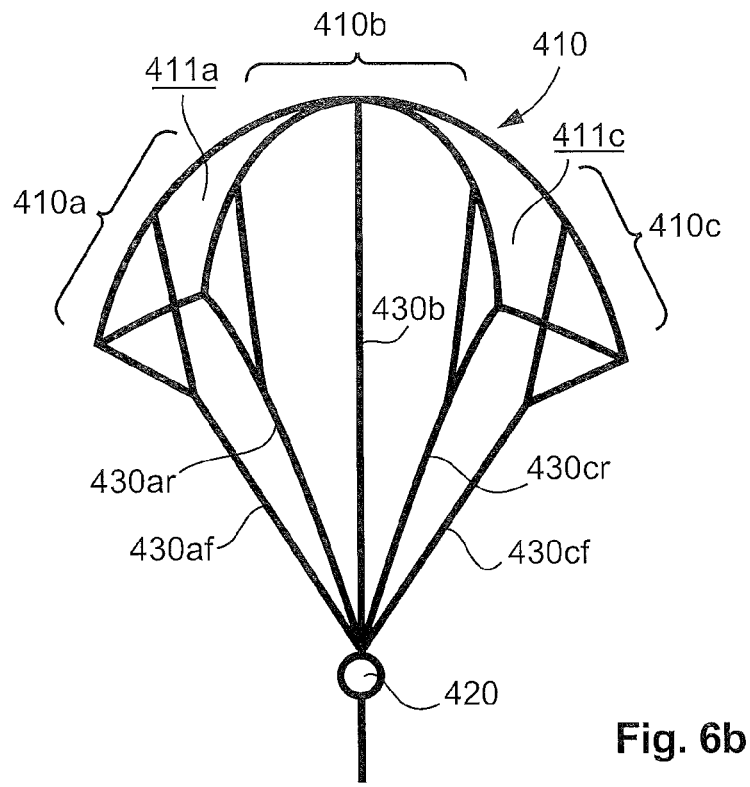
Figure 6C:
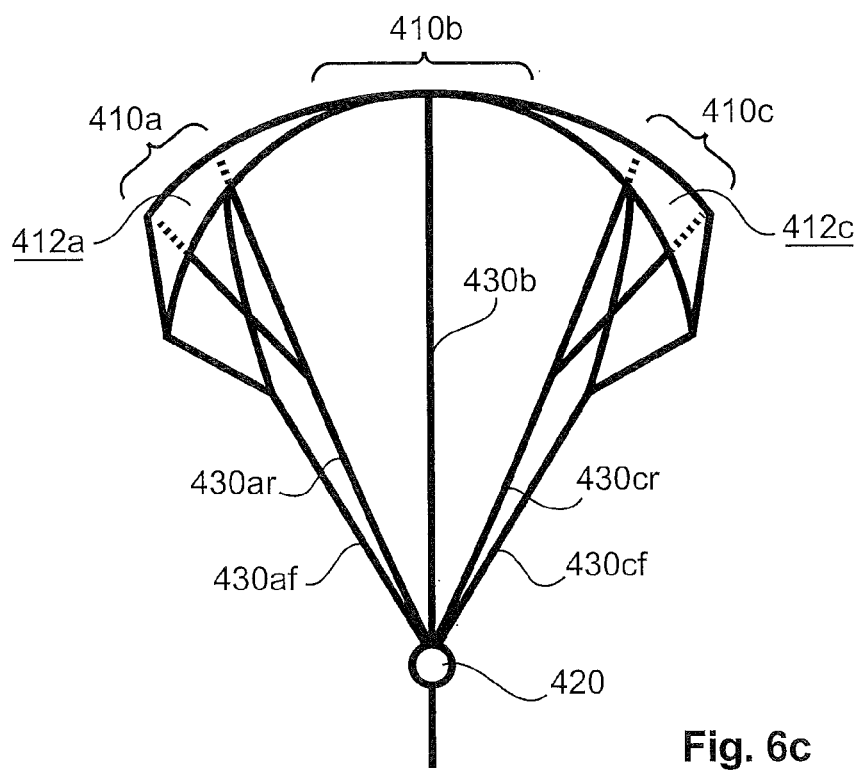

FIGS. 6a-c show front elevational views of three different washout conditions of an aerodynamic wing 410. The wing is coupled via three pairs of tractive lines 430a-c to a steering unit 420. Each pair of tractive lines 430a-c comprises a front tractive line (as shown for front tractive lines 430af, cf) and a rear tractive line (as shown for rear tractive lines 430ar, cr), wherein the front tractive line couples the front edge of the wing to the steering unit and the rear line couples the rear edge of the wing to the steering unit.

As can be seen from the figures, the front and rear tractive lines of the pairs 430a, c of tractive lines coupling the tips 410a, c of the aerodynamic wing 410 to the steering unit are divided up into two tractive line sections in the upper part adjacent to the wing thus constituting branched tractive lines in the form of an Y.

FIG. 6a shows the aerodynamic wing in a first washout condition, wherein the wing is not twisted and all regions of the wing have the same angle of attack.

As shown in FIG. 6b, in a second washout condition the tips 410a, c of the aerodynamic wing are twisted in relation to the middle region 410b of the wing. This may be achieved by allowing the front tractive lines 430af, cf to undergo a higher elongation than the rear tractive lines 430ar, cr. In a consequence, a symmetrical wash out condition is provided, wherein the angle of attack in the tips 410a, c is higher than the angle of attack in the middle region 410b. Thus, in the front elevational view shown in FIG. 6b, the underside 411a, c of the wing 410 can be seen.

FIG. 6c shows a third washout condition. In this washout condition the rear tractive lines 430ar, 430cr are elongated more than the front tractive lines 430af, 430cf thus resulting in a reduced angle of attack in the tip regions 410a, c when compared with the angle of attack in the middle region 410b of the aerodynamic wing. Thus, in this third washout condition the upper side 412a, c can be seen in the tip regions 410a, b in the front elevational view shown in FIG. 6c.

The invention claimed is:

1. An aerodynamic wind propulsion device, comprising:
    an aerodynamic wing (10) being connected to a steering unit (20) located below the aerodynamic wing via a plurality of tractive lines,
    a tractive cable (40a, b), a first end of the tractive cable being connected to the steering unit (20) and a second end of the tractive cable being connected to a base platform,
    the aerodynamic wing (10) having an aerodynamic profile which generates an uplift force in the direction of the tractive cable (40a, b) when the airflow direction is about perpendicular to the tractive cable,
    wherein at least two of said plurality of tractive lines have elastic behavior in a load range occurring in use of the aerodynamic wind propulsion device and the elastic behavior of said at least two tractive lines is different; and
    wherein at least one of said tractive lines has elastic properties which are different from other tractive lines to effect a deformation of the aerodynamic wing element in a first load condition to produce at least one of the following effects:
        to decrease the uplift forces generated by the aerodynamic wing,
        to increase the air drag generated by the aerodynamic wing and to establish an optimum aerodynamic shape in a second load condition to generate a maximum uplift force and/or minimum air drag by the aerodynamic wing;
    said at least one tractive line having elastic properties which are different from the other tractive lines is coupled to a section of the aerodynamic wing to effect a deformation of said center section in the first load condition such that the aerodynamic profile in the first load condition has a cross section that is different from an ideal aerodynamic wing cross section.

2. Aerodynamic wind propulsion device according to claim 1,
    characterized in that at least one of said plurality of tractive lines (30a-32a) connecting the aerodynamic wing (10) to the steering unit (20) has unproportional elastic properties in the load range occurring in use of the aerodynamic wind propulsion device.

3. Aerodynamic wind propulsion device according to claim 2,
    characterized in that at least one of said plurality of tractive lines has unproportional elastic properties formed by said two tractive line sections.

4. Aerodynamic wind propulsion device according to claim 2,
    characterized in that said at least one tractive line having unproportional elastic properties has a first stress-strain behaviour in a first range of the load range occurring in use of the aerodynamic wind propulsion device and a second stress-strain behaviour in a second range of the load range occurring in use of the aerodynamic wind propulsion device whereby the first and the second stress strain behaviour and the first and the second range are different from each other.

5. Aerodynamic wind propulsion device according to claim 1,
    characterized in that multiple tractive lines are provided having different elastic properties in such a way that the angle of attack of the aerodynamic wing in relation to the steering unit is higher in a condition where a low force is acting on the tractive lines than in a condition where a high force is acting on the tractive lines.

6. Aerodynamic wind propulsion device according to claim 1,
    characterized in that one or more tractive lines coupling the front of the aerodynamic wing to the steering unit have a first stress-strain ratio in a load range below a first load condition and wherein one or more tractive lines coupling the rear end of the aerodynamic wing to the steering unit have a second stress-strain ratio in a load range below a second load condition, wherein the first stress-strain ratio is lower than the second stress-strain ratio.

7. Aerodynamic wind propulsion device according to claim 6,
characterized in that one or more tractive lines coupling a front section of the aerodynamic wing to the steering unit maintain a third stress-strain ratio in a load range above a first load condition and wherein one or more tractive lines coupling a rear section of the aerodynamic wing to the steering unit have a fourth stress-strain ratio in a load range above a second load condition.

8. An aerodynamic wind propulsion device, comprising:
an aerodynamic wing (10) being connected to a steering unit (20) located below the aerodynamic wing via a plurality of tractive lines,
a tractive cable (40a, b), a first end of the tractive cable being connected to the steering unit (20) and a second end of the tractive cable being connected to a base platform,
the aerodynamic wing (10) having an aerodynamic profile which generates an uplift force in the direction of the tractive cable (40a, b) when the airflow direction is about perpendicular to the tractive cable,
wherein at least two of said plurality of tractive lines have elastic behavior in the load range occurring in use of the aerodynamic wind propulsion device and the elastic behavior of said at least two tractive lines is different,
characterized in that one tractive line of said plurality of tractive lines is formed by at least two parallel tractive line sections which are attached to identical attachment points at the aerodynamic wing and the steering unit, respectively whereby the length and the elastic properties of said two tractive line sections is selected such that
in a first low load condition within the load range occurring in use of the aerodynamic wind propulsion device the lengths of said two tractive line sections are different and
at a second medium load condition within said load range, a shorter one is elongated to such an extent that its length corresponds to the length of a longer one of said two tractive lines, and
at a third high load condition within said load range, both of said two tractive lines are elongated.

9. An aerodynamic wind propulsion device, comprising:
an aerodynamic wing (10) being connected to a steering unit (20) located below the aerodynamic wing via a plurality of tractive lines,
a tractive cable (40a, b), a first end of the tractive cable being connected to the steering unit (20) and a second end of the tractive cable being connected to a base platform,
the aerodynamic wing (10) having an aerodynamic profile which generates an uplift force in the direction of the tractive cable (40a, b) when the airflow direction is about perpendicular to the tractive cable (207),
wherein at least two of said plurality of tractive lines have elastic behavior in the load range occurring in use of the aerodynamic wind propulsion device and the elastic behavior of said at least two tractive lines is different,
characterized in that at least one of said tractive lines has elastic properties, which are different from other tractive lines to provide a first curvature of the aerodynamic wing in a first load condition and to change the wing from said first curvature to a second curvature in a second load condition, wherein the curvature of the aerodynamic wing is a curvature in a side-elevational cross section of the aerodynamic wing or a front cross section of the aerodynamic wing.

10. An aerodynamic wind propulsion device, comprising:
an aerodynamic wing (10) being connected to a steering unit (20) located below the aerodynamic wing via a plurality of tractive lines,
a tractive cable (40a, b), a first end of the tractive cable being connected to the steering unit (20) and a second end of the tractive cable being connected to a base platform,
the aerodynamic wing (10) having an aerodynamic profile which generates an uplift force in the direction of the tractive cable (40a, b) when the airflow direction is about perpendicular to the tractive cable,
wherein at least two of said plurality of tractive lines have elastic behavior in the load range occurring in use of the aerodynamic wind propulsion device and the elastic behavior of said at least two tractive lines is different,
characterized in that at least one of said tractive lines has elastic properties which are different from other tractive lines to provide a first washout of the aerodynamic wing in a first load condition and to change the wing from said washout to a second washout in a second load condition, wherein the washout of the aerodynamic wing is a relation of the angle of attack in a first region of the aerodynamic wing to the angle of attack in a second region of the aerodynamic wing.

11. Aerodynamic wind propulsion device according to claim 10,
characterized in that the washout is changed in such a way that the angle of attack of the side ends of the aerodynamic wing in a front elevational view is changed between the first and the second load condition.

* * * * *